(No Model.)
E. A. LELAND.
BRAKE HOSE COUPLING.
No. 408,116. Patented July 30, 1889.
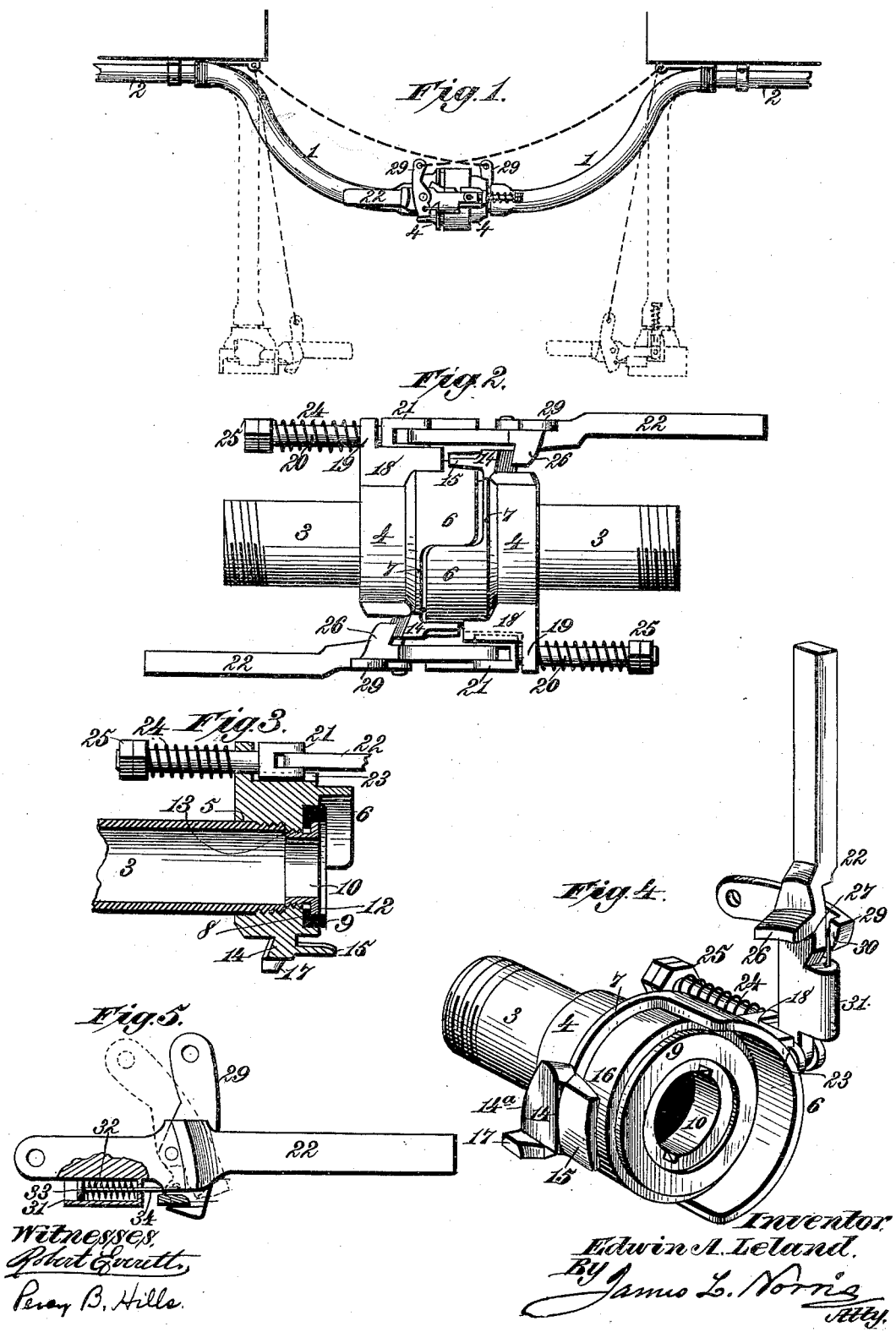
Witnesses,
Robert Everett,
Percy B. Hills.
Inventor
Edwin A. Leland.
By James L. Norris
Atty.

UNITED STATES PATENT OFFICE.

EDWIN A. LELAND, OF BROOKLYN, NEW YORK, ASSIGNOR TO LEONARD RICHARDSON, OF SAME PLACE.

BRAKE-HOSE COUPLING.

SPECIFICATION forming part of Letters Patent No. 408,116, dated July 30, 1889.

Application filed April 11, 1889. Serial No. 306,787. (No model.)

*To all whom it may concern:*

Be it known that I, EDWIN A. LELAND, a citizen of the United States, residing at Brooklyn, in the county of Kings and State of New York, have invented new and useful Improvements in Brake-Hose Couplings, of which the following is a specification.

My invention relates to pipe or hose couplings used for connecting the air or steam pipes employed upon railway-cars for either operating the brakes or for heating the interiors.

The purpose of the invention is to provide means for detachably connecting the pipe or hose sections between the cars automatically, whereby separation may be instantaneously effected at any moment, and whereby the coupling devices are positively locked in engagement by automatic means.

It is my purpose also to simplify and improve the construction and operation of devices of this class, and provide a coupling which shall be secure, free from all tendency to leakage, and shall be secured closely together by positive means.

It is my purpose also to provide a coupling-lever having a pivotal axis which yields to the interlocking engagement with a constantly-increasing elastic tension, whereby a complete lock is rendered possible and certain in all cases.

The invention consists in the several novel features of construction and operations of parts hereinafter fully set forth, and then definitely pointed out in the claims following this specification.

Referring to the accompanying drawings, Figure 1 is a view in side elevation of the coupling as it appears in use. Fig. 2 is a plan view of the coupling enlarged. Fig. 3 is a central longitudinal section of one part of the coupling. Fig. 4 is a perspective view of the same on an enlarged scale. Fig. 5 is a detail view, partly in section, of one of the locking-levers with its fastening, showing its action in connection with the stud of the coupling.

In the drawings, the reference-numeral 1 denotes the hose-sections connected to the ends of the air or steam pipes 2 beneath the cars, such as are used in the Westinghouse and other brakes. Upon the end of each flexible hose-section is mounted a coupling consisting of a short metallic pipe 3, tapped into a substantially cylindrical block 4, the male thread on one and the female thread on the other being cut to comprise a portion only of the engaging surfaces, leaving a space 5 on each wherein the parts are connected by surface contact only, as seen in Fig. 3; hence the weakening of the tube, caused by its thread, is without injurious effect, as this portion is carried into the body of the block, and the whole strain and leverage are thrown upon the body thereof where its full strength is available, instead of upon the last thread of the male screw, as would be the case were the threading continued to the mouth of the opening in block.

The section 4 is formed with an exterior semicircular projecting shell 6, the outer portion being cut away as far back as a rib 7, which runs around and meets the longitudinal edge of the half-shell 6. Within the latter is formed a seat 8, receiving a packing-ring 9, and within the latter is inserted a thimble 10, having a flange 12, which seats upon the inner margin of the ring. The thimble is tapped into the opening 13 of the coupling-section and holds the packing-ring firmly in place.

Upon one side of the coupling is formed a boss or projection 14, provided on its rearward edge with a curved cam-surface 14$^a$, and having a curved guide-piece 15 projecting forward and separated from that portion 16 which is formed by cutting away the metal back to the rib 7. From the boss 14 also projects a lug or latch-piece 17, its edge 18 being slightly beveled, for a purpose presently to be shown. Upon the opposite side of the coupling is formed an angle-bracket 18, one part 19 thereof being drilled to receive a bolt 20, having a forked end 21, within which is pivotally mounted the end of a locking-lever 22, one fork of the bearing lying in a groove 23, formed in the other part of the angular bracket. A strong spring 24 encircles the bolt and bears against a nut 25 on its end, thereby drawing the bolt back normally until its forked end strikes the projecting member 19 of the bracket. Upon the inner face of the locking-lever 22 is formed a cam 26, having a curved cam-surface 27, which engages a corresponding curved surface 28 on the rearward face of the boss 14 of the engaging section of the coupling. Within a recess in the outer face of the locking-lever is pivotally mounted a dog 29, having on its lower end an inwardly-turned catch 30, beveled off on its under face to the edge. In a chamber 31, formed by an extension of the locking-lever, is stored a spring 32, bearing at one end against a head 33, from which springs a rod 34, passing through the spring and out through an opening in the end of the extension containing the spring, its projecting end being connected to the dog 29, constantly drawing the latter toward the pivotal point of the locking-lever. The cam-surfaces on the bosses 14 and the engaging cam-surfaces of the cams 26 are inclined at an angle to the axis of the coupling, as shown in Fig. 2, whereby their engagement draws the levers 22 inward or toward the pipe.

The operation is as follows: The coupling-sections are brought together, the two semi-cylindrical shells being alternately placed, and each passing under one of the guides 15. The locking-levers are now thrown down, each bringing its cam 26 upon the cam-surface on the rear of the boss 14 on the opposite coupling-section. As this engagement is effected the catch on each dog 29 strikes with its beveled under surface upon the latch-piece 17, throwing the catch back and compressing the spring 32 until the catch passes the beveled edge of the latch-piece, when it snaps under the latter by the tension of the spring, holding the levers positively in place. To the upper end of each dog 29 is connected a chain, which is attached to the car carrying the engaging coupling-section at a length which is less than the length of the hose-piece. When the cars are coupled, the flexible sections will hang, as in Fig. 1, with the chains nearly at tension, but when uncoupled and drawn apart the chains will be drawn taut before the hose-pieces are affected at all, thereby tripping the dogs, and then raising the locking-levers, whereupon the couplings will fall apart, as shown in Fig. 1. It will be noted that the catch of the dog 29, when thrown off the latch-piece, is brought against the under side of the locking-lever, as shown in Fig. 5. As the strain upon the chains, to release the lock engagement of these levers is always considerable, and may, should the parts stick or become jammed tight, be very great, this strain, instead of falling entirely upon the pivots of the dogs, will be taken up in great part by the catches 30, thereby avoiding the danger of breaking or bending the pivot-pins of the dogs.

The invention may be used upon telescopic pipes, as well as upon pipes of the class shown, and will operate in precisely the same way, save that the detached sections will not drop.

What I claim is—

1. In a brake-hose coupling, the combination, with two separable coupling-sections, of levers pivoted thereon in bearings, which yield against the tension of springs, each lever having a cam engaging a cam projection on the opposite section, a latch on each coupling-section, and a spring-actuated dog pivoted on each locking-lever and having a catch to engage a latch, substantially as described.

2. In a brake-hose coupling, the combination, with two separable coupling-sections, of locking-levers pivoted thereon and having cams engaging with cam projections on the opposite section, and spring-actuated dogs pivoted on the levers and automatically engaging latch-pieces on the coupling to hold the two levers in locking position, substantially as described.

3. In a brake-hose coupling, the combination of the two sections of a coupling, each having at one side a bracket provided with a hole and at the opposite side a cam projection, a headed bolt extending through and lengthwise movable in the hole of each bracket, a spring encircling each bolt between its head and the bracket, a locking-lever pivoted to each bolt at the side of the bracket opposite the spring, a latch on each coupling-section, and a spring-actuated dog pivoted on each lever in advance of the pivot-point of the latter and having a catch to engage a latch, substantially as described.

4. In a brake-hose coupling, the combination, with two separable coupling-sections, each having upon one side a cam projection, and upon the other side a pivoted locking-lever, of dogs pivoted upon said levers and having inwardly-turned catches beveled upon their lower surfaces, and springs housed in the levers and drawing upon rods connected to said levers having cams engaging the cam projections, and the latter being provided with latch-pieces for the catches on the dogs, substantially as described.

In testimony whereof I have affixed my signature in presence of two witnesses.

EDWIN A. LELAND.

Witnesses:
A. H. BRADLEY,
MILLARD F. COOK.